United States Patent [19]

Lerner

[11] Patent Number: 5,514,356
[45] Date of Patent: May 7, 1996

[54] SYSTEM FOR THE PREVENTION OF DIOXIN FORMATION IN CUMBUSTION FLUE GASES

[75] Inventor: Bernard J. Lerner, Pittsburgh, Pa.

[73] Assignee: Beco Engineering Company, Oakmont, Pa.

[21] Appl. No.: 400,444

[22] Filed: Mar. 7, 1995

Related U.S. Application Data

[63] Continuation of Ser. No. 130,523, Oct. 1, 1993, abandoned.
[51] Int. Cl.⁶ ................................................ B01D 53/70
[52] U.S. Cl. ........................... 423/240 S; 95/132; 95/142
[58] Field of Search .......................... 423/240 S, 245.1, 423/245.3, 215.5, 210; 95/132, 142, 902

[56] References Cited

U.S. PATENT DOCUMENTS

| | | | |
|---|---|---|---|
| 4,061,476 | 12/1977 | Hö lter et al. | 55/77 |
| 4,246,242 | 1/1981 | Butler et al. | 423/210 |
| 4,273,747 | 6/1981 | Rasmussen | 423/210 |
| 4,620,492 | 11/1986 | Vogg et al. | 110/345 |
| 4,844,875 | 7/1989 | Ettehadieh | 423/210 |
| 4,889,698 | 12/1989 | Moller et al. | 423/210 |
| 5,021,229 | 6/1991 | Gullett | 423/245.3 |
| 5,171,552 | 12/1992 | Miura et al. | 423/239 |
| 5,185,134 | 2/1993 | Gullett | 423/240 R |

FOREIGN PATENT DOCUMENTS

| | | |
|---|---|---|
| 338186 | 7/1986 | Denmark . |
| 208490 | 1/1987 | European Pat. Off. . |
| 0328874 | 1/1989 | European Pat. Off. . |
| 4023030 | 7/1990 | Germany . |
| 53-38275 | 10/1978 | Japan . |
| 125716 | 2/1973 | Norway . |
| 92-00794 | 1/1992 | WIPO ............................ 423/240 R |
| 9219365 | 11/1992 | WIPO . |
| 9308902 | 5/1993 | WIPO . |

OTHER PUBLICATIONS

"Factors that can Influence and Control the Emissions of Dioxins and Furans from Hazardous Waste Incinerators", P. Acharya et al., J. Air Waste Manage. Assoc., vol. 41, No. 12, pp. 1605–1615, 1991. Dec.
"Mechanism of Chlorination of Aromatic Compounds Adsorbed on the Surface of Fly Ash from Municipal Incinerators", Hoffman et al., Environ. Sci. Technol., pp. 1625–1641, vol. 24, No. 11, 1990 (no month).
"Dioxin/Furan Removal: Negative Efficiency Behavior, Causes and Effects", Lerner, 85th Annual Meeting of the Air & Waste Manage. Assoc., Kansas City, MO. Jun. 21–26, 1992.
Industrial Minerals and Rocks, Chapter 6, pp. 93, 96, 98, 99, AIMME, Third Edition, 1960. (no month).
Product Information Bulletin No. 5108, Hydrodarco, 1991, Mar., American Norit Company.
"Gas Dehydration and Purification", Gas Purification, Third Ed., Kohl et al. (no month).
"Chemistry", Chemical Kinetics [15.7], Bailar et al., 1978. (no month).
"Air Toxics Control in Spray Dryer Absorption Systems"; Gleiser et al.; 86th Annual Meeting of the Air & Waste Management Assoc., Denver Colorado, Jun. 13–18, 1993. pp. 3 and 24.
"The Relationship Between de Novo Synthesis of Polychlorinated Di benzo–p–dioxins and Dibenzofurano and Low––Temperature Carbon Gasification in Fly Ash", Milligan et al.; Environ. Sci. Technol. 1993, 27, 1595–1601. no month.
"Status of EPA Regulatory Development Program For Medical Waste Incinerators—Results of Emission Test Program", Durkee et al., 11 Annual Incinerator Conference, Albuquerque, New Mexico, May 1992.
"Mercury Chemistry in Simulated Flue Gases Related to Waste Incineration Conditions", Hall et al., Env. Science & Tech., vol. 24, p. 111 (1990). no month.
"Dry Sorbent Emission Control Technologies", Muzio et al., J. of Air Pollution Control Assoc., vol. 37, May 1987, pp. 642–653.

*Primary Examiner*—Ferris Lander
*Assistant Examiner*—Amy M. Harding
*Attorney, Agent, or Firm*—Roylance, Abrams, Berdo & Goodman

[57] ABSTRACT

Environmental release of carcinogenic polychlorinated dibenzo-dioxins and polychlorinated dibenzo-furan compounds that typically result from combustion of materials containing chlorine or hydrochloric acid-generating components is minimized by preferential sorption of the precursor reactants on sorbents added to exhaust gas at high temperatures containing such precursors prior to conversion of the precursors to carcinogenic compounds normally occurring as the exhaust gas is cooled.

44 Claims, 2 Drawing Sheets

SYSTEM FOR THE PREVENTION OF DIOXIN FORMATION IN CUMBUSTION FLUE GASES

This is a continuation of application Ser. No. 08/130,523, filed Oct. 1, 1993, now abandoned.

CROSS-REFERENCE TO RELATED APPLICATIONS

Reference is hereby made to U.S. application Ser. No. 08/073,940, now abandoned, entitled "Removal of Mercury and Cadmium and Their Compounds From Incinerator Flue Gases" to Bernard J. Lerner filed Jun. 10, 1993, Ser. No. 08/075,234, now abandoned, entitled "Method and Apparatus for Minimizing Environmental Release of Toxic Compounds in the Incineration of Wastes" to Bernard J. Lerner filed Jun. 14, 1993, and U.S. Pat. No. 5,238,665 entitled "Method for Minimizing Environmental Release of Toxic Compounds in the Incineration of Wastes" to Bernard J. Lerner issued Aug. 24, 1993, the disclosures of which are hereby incorporated by reference.

FIELD OF THE INVENTION

This invention relates to a method and apparatus for minimizing formation and environmental release of carcinogenic polychlorinated dibenzo-dioxins and polychlorinated dibenzo-furan compounds that typically result from combustion of fuels and incineration of wastes containing chlorine or hydrochloric acid generating components. More particularly, this invention relates to preventing formation of toxic, polychlorinated organic compounds in combustion operations, including incineration of wastes and burning of fuels in power plants, by selective adsorption of the precursor compounds at elevated temperatures.

BACKGROUND OF THE INVENTION

Combustion off-gases from the burning of fuels or the incineration of medical and other wastes contain a variety of chemical compounds known to be hazardous to human health. Among these combustion products are a number of specific polychlorinated organic compounds that are known to be carcinogenic at trace concentrations. The most toxic of these chlorinated hydrocarbons are 2,3,7,8 tetrachlorodibenzo-dioxin and the penta- chloro-, hexachloro-, heptachloro- and octachloro- homologs, hereinafter collectively designated as polychlorinated dibenzodioxins, PCDD, and the polychlorodibenzo-furan (PCDF) analogs, hereinafter collectively referred to as polychlorinated dibenzofurans, PCDF. In general, the lower number (tetra and penta) chlorinated congeners are the more carcinogenic to humans, and the octachloro congeners are conventionally held to be non-carcinogenic.

Efficient combustion at high temperatures, typically 1000°–1200° C., at adequate retention times, is known to destroy any PCDD/PCDF originally present in the fuel or wastes. However, detailed investigation of post-combustion chemical reactions has shown that the PCDD/PCDF form again on cooling down of the combustion gases. PCDD/PCDF are known to form from aromatic precursor compounds such as chlorobenzenes, chlorophenols, polychlorinated diphenyl ethers, polychlorinated biphenyls, benzo-furans, benzo-dioxins and the like, hereinafter collectively referred to as pre-dioxins and pre-furans.

In an article by Acharya, DeCicco and Novak, "Factors That Can Influence and Control the Emissions of Dioxins and Furans from Hazardous Waste Incinerators", published in the *Journal of Air and Waste Management*, pp. 1605–1615, Vol. 41, No. 12, 1991, the disclosure of which is hereby incorporated by reference, the authors state that the pre-dioxin and pre-furan compounds are believed to be formed at a temperature of about 500° C. Dioxins then form downstream as the gases are further cooled, typically by an energy recovery boiler, in the range of approximately 250° to 400° C.

In the combustion of chlorine-containing fuels or wastes, hydrochloric acid gas, HCl, is invariably formed. In particular, the combustion of biomedical wastes (BMW) and municipal solid wastes (MSW) which contain relatively significant amounts of chlorine-containing plastics, such as polyvinyl chloride, produce appreciable amounts of HCl. Fundamental studies by Hoffman, Eiceman, Long, Collins, and Lu, "Mechanism of Chlorination of Aromatic Compounds Adsorbed on the Surface of Fly Ash from Municipal Incinerators", *Environmental Science & Technology*, pp. 1625–1641, Vol. 24, No. 11, 1990, have shown that the post-combustion formation of PCDD and PCDF takes place on the surfaces of fly ash by way of chlorination of adsorbed pre-dioxin and pre-furan compounds. Further, they showed that the active chlorinating agent is ferric chloride, $FeCl_3$, formed by reaction of the HCl in the gas with the surface atoms of iron contained in the fly ash structure. Precursor adsorption equilibria is generally unfavorable at temperatures above 450° C., which therefore limits the amount of PCDD/PCDF that can form by means of the fly ash adsorption/ferric chloride chlorination mechanism at the higher temperatures. The major portion of PCDD/PCDF forms as the temperature decreases to the level where adsorption on fly ash becomes greater than desorption equilibria, typically below 450° C.

Lerner, in a paper entitled "Dioxin/Furan Removal: Negative Efficiency Behavior, Causes and Effects", presented at the 85th Annual Meeting of the Air & Waste Management Association, Kansas City, Miss., Jun. 21–26, 1992, the disclosure of which is hereby incorporated by reference, showed that PCDD/PCDF formation from the pre-dioxins and pre-furans proceeds to an extreme extent at the lower temperature range of 150°–250° C. if the fly ash holding the adsorbed pre-dioxins and pre-furans is retained for extended residence times in an HCl or $FeCl_3$-containing gas stream. Further, it was shown that in this temperature range, the lower molecular weight PCDD/PCDF congeners "distill" off into the gas phase from the adsorbed fly ash phase in the order of their relative fugacities. This results in an undesirable increase in the final exhaust gas content of the more toxic congeners, such as the tetra- and penta- chlorinated dioxins and furans; the higher chlorine number, and less toxic, congeners tend to remain on the fly ash.

U.S. Pat. No. 4,889,698 to Moller et al. use activated carbon for PCDD/PCDF removal. However, use of activated carbon to remove PCDD/PCDF after such compounds have been formed simply transfers the toxic PCDD/PCDF from the gas phase to the sorbent phase. The conventional use of activated carbon at low temperatures does not serve to reduce the total amount of PCDD/PCDF in the system (fly ash plus gas plus carbon) nor does it prevent its formation. Despite use of carbon at lower temperatures, the total amount of toxics formed remains fixed; only the distribution is changed. Additionally, the sorbent becomes contaminated with the highly toxic PCDD/PCDF. Disposal of the activated carbon is then a problem because the PCDD/PCDF-contaminated carbon is considered to be a hazardous material, and cannot be disposed of in sanitary landfills. The costs of the necessary disposal in a hazardous waste landfill are inordinately high. It would be desirable to avoid the costs of disposal of PCDD/PCDF contaminated sorbents or fly ash. It would also be desirable to avoid the formation of the PCDD and PCDF on the fly ash in the first place. However, methods and means of preventing adsorption of the precursor reactants on iron-containing fly ash have hitherto not been available.

SUMMARY OF THE INVENTION

A process useful for reducing formation of PCDD/PCDF and its transfer to combustion exhaust gases has now been discovered, which process involves contacting the hot gases containing pre-dioxin and pre-furan compounds with substantially dry, finely divided, solid sorbent material at a temperature above that favorable for adsorption of the precursor reactants, i.e., pre-dioxin and pre-furan compounds, on the sorbent material, e.g., above 290° C., but compatible with the preservation of the sorbent structure, subsequently preferentially adsorbing the pre-dioxin and pre-furan compounds on the sorbent as the gas cools down to temperatures favorable to adsorption of the pre-dioxin, pre-furan compounds with substantially no conversion of the adsorbed precursor reactants to polychlorinated benzodioxin and benzofuran compounds. The method of this invention adsorbs the dioxin and furan precursor compounds from the gas preventing fly ash formed in situ from adsorbing the reactants and processing them into PCDD/PCDF. In the present invention, "sorbent" shall mean any material with a surface area of at least 50 m$^2$/g, having a selective capacity for the adsorption of pre-dioxin and pre-furan aromatic organic molecules at temperatures of 290° C. and above, up to the temperature at which structural integrity of the sorbent for adsorbing the pre-dioxins and pre-furans no longer exists.

According to another embodiment of the present invention, the pre-dioxin and pre-furan compounds are adsorbed on acid-treated sorbents which do not effect significant conversion of pre-dioxins and pre-furans to PCDD/PCDF. According to this embodiment of the present invention, the process for minimizing environmental release of polychlorinated benzodioxin and benzofuran compounds in waste exhaust gases comprises contacting combustion process fly ash and combustion exhaust gases containing precursor reactants of polychlorinated benzodioxin and benzofuran compounds with substantially dry, finely divided, solid, macroporous, acid-treated sorbent material at a temperature above that favorable for adsorption of the precursor reactants on the acid-treated sorbent material, but compatible with the thermal and chemical stability of the acid-treated sorbent material to form a first stream, cooling the first stream to a temperature favorable for adsorption of the precursor reactants on the acid-treated sorbent material, such that the precursor reactants are adsorbed on the acid-treated sorbent material, passing a second stream comprising the pre-dioxin and pre-furan reactant-depleted gas stream, combustion process fly ash and spent sorbent to a solids separation zone for removal of particulate matter comprising the spent sorbent and the fly ash, removing the particulate matter and withdrawing a gas stream substantially free of carcinogenic polychlorinated benzodioxin and benzofuran compounds.

The acid-treated sorbents of the present invention contain little or no chloride-reactable metal compounds in their structure. Also useful are those sorbents which may have chloride-reactable metal compounds in their structure, but which adsorb the pre-dioxin and pre-furan compounds so tightly that surface migration of the adsorbed molecules to reactive metal chloride sites is minimized. In this manner, the process of the present invention removes pre-dioxins and pre-furans from exhaust gases formed by combustion while preventing their conversion to PCDD/PCDF.

According to another preferred embodiment of the invention, environmental release of polychlorinated benzodioxin and benzofuran compounds in exhaust gases is minimized by a process comprising burning chlorine-containing fuels in a combustion zone to form combustion process fly ash and combustion exhaust gases containing precursor reactants of polychlorinated benzodioxin and benzofuran compounds, introducing substantially dry, finely divided, solid, macroporous, acid-treated sorbent material into the combustion zone or into the exhaust gases upon discharge from the combustion zone at temperatures compatible with the thermal and chemical stability of the acid-treated sorbent material to admix with the combustion gases and form a first stream, cooling the first stream to a temperature favorable for adsorption of the precursor reactants on the acid-treated sorbent material, such that the precursor reactants are adsorbed on the acid-treated sorbent material, passing a second stream comprising the pre-dioxin and pre-furan reactant-depleted gas stream, combustion process fly ash and spent sorbent to a solids separation zone for removal of particulate matter comprising the spent sorbent and the fly ash, and withdrawing a gas stream substantially free of carcinogenic polychlorinated benzodioxin and benzofuran compounds.

According to this embodiment of the present invention in which the sorbent material is added directly to the combustion zone or into the exhaust gases upon discharge from the combustion zone, formation of PCDD/PCDF is minimized to the greatest extent possible by providing the solid sorbent at or near formation of the precursor reactants, thereby providing maximum time for contact and adsorption of the precursor reactants by the sorbent and prevention of their conversion into PCDD/PCDF.

According to another aspect of the present invention, apparatus is provided which achieves minimization of PCDD/PCDF formation, which apparatus comprises, in combination, incinerator means, means for introducing combustibles or wastes into said incinerator means, means for introducing finely divided solid sorbent directly into said incinerator means for contact with hot exhaust gases formed in the incinerator means, multistage heat exchange means for cooling the exhaust gases containing the solid sorbent, and solid separation means communicating with the heat exchange means for separating exhaust gases from sorbent containing adsorbed pre-dioxin and pre-furan reactants.

According to a further aspect of the present invention, apparatus is provided which achieves minimization of PCDD/PCDF formation, which apparatus comprises, in combination, incinerator means, means for introducing combustibles or wastes into said incinerator means, means for introducing finely divided solid sorbent into hot exhaust gases formed into exhaust gases formed in said incinerator means, multistage heat exchange means for cooling said exhaust gases having at least a first cooling stage and a second cooling stage, solid separation means communicating with the final stage of said heat exchange means for separating exhaust gases from sorbent containing adsorbed pre-dioxin and pre-furan reactants, the means for introducing finely divided solid sorbent into hot exhaust gases communicating with the multistage heat exchange means downstream of the first cooling stage.

DETAILED DESCRIPTION OF THE INVENTION

Figure 1:
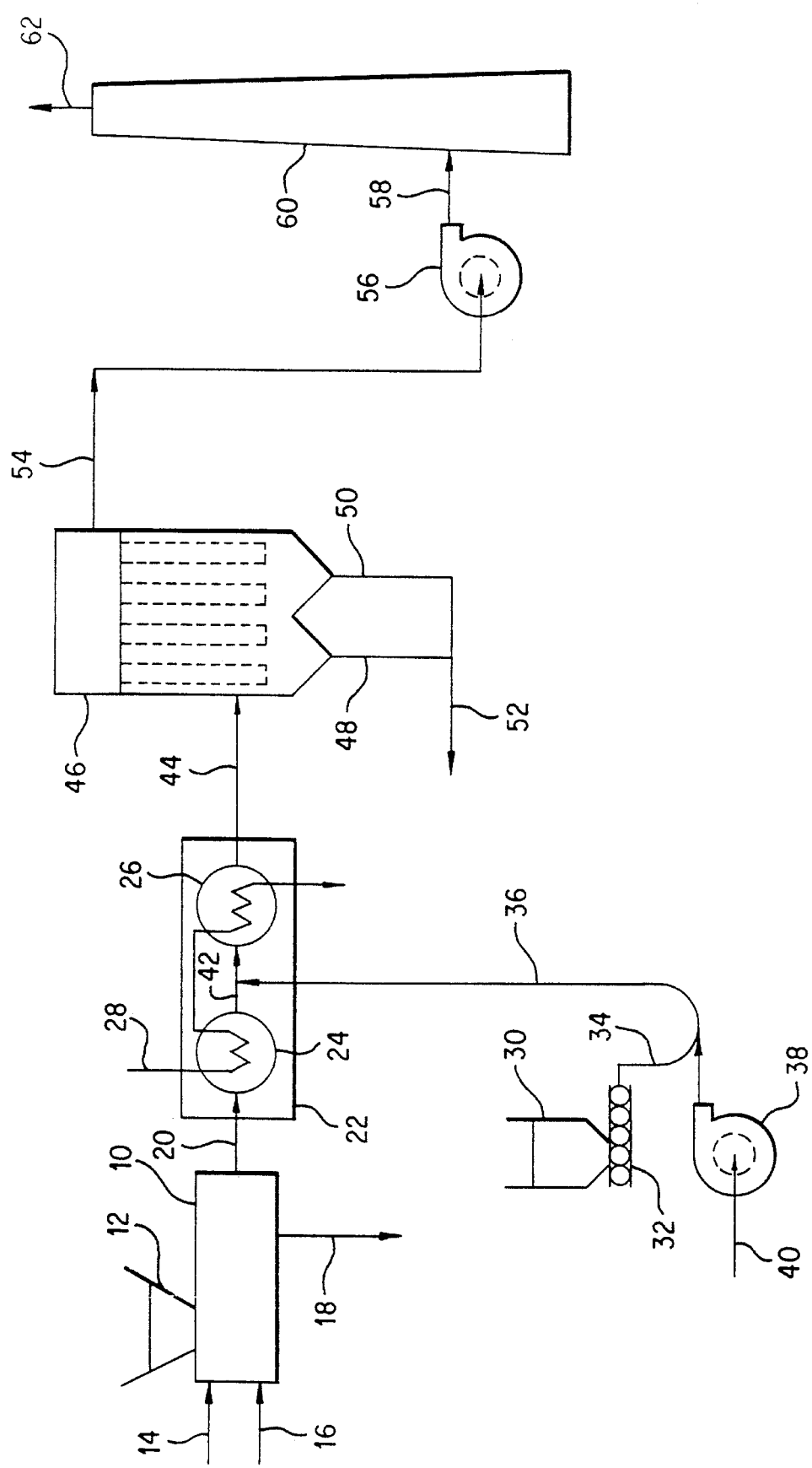
FIG. 1 is a schematic flow drawing illustrating one embodiment of the invention.

Referring now to FIG. 1, municipal or biological wastes are fed to incinerator 10 through ram or chute 12. Incinerator 10 is heated by burning natural gas supplied through conduit 14 in air supplied by conduit 16 until the combustion of the wastes provides sufficient heat to sustain the necessary incinerator temperatures, which are normally in the range of from about 400° C. to about 1100° C. Bottom furnace ash is discharged from incinerator 10 by means of conduit 18 and the combustion exhaust gases withdrawn by conduit 20 are passed to a multi-pass waste heat boiler 22 having an initial pass 24 and a final pass 26. Although not depicted, boiler 22 can also have three or more passes. In boiler 22, boiler water fed to conduit 28 is converted to steam by contacting the exhaust gases, which, in turn, are cooled to a temperature in the range of, for example, 290° C. to 450° C. in initial pass 24 and, for example, to a temperature in the range of 200° C. to 280° C. in the final pass 26.

Finely divided sorbent is fed from hopper 30 to screw feeder 32 and then to line 34 where the sorbent joins pneumatic feed line 36 supplied by blower or compressor 38 operating on an air stream supplied by conduit 40.

The pneumatically-conveyed finely-divided solid sorbent is mixed with combustion flue gas in line 42, which is at a temperature in the range of 290° C. to 450° C. prior to entry of the exhaust gas into final pass 26 of energy recovery boiler 22.

By mixing the sorbent with the combustion flue gas at an elevated temperature in the range of 290° C. to 450° C., preferably 300° C. to 400° C., especially between about 350° C. to about 400° C., the sorbent can preferentially adsorb the dioxin and furan precursor compounds from the gas, preventing the in situ fly ash from adsorbing the reactants and processing or converting them into PCDD/PCDF.

Suitable sorbents are macroporous sorbents, having a major portion of their pores in the 10 to 80 Angstrom size range. Sorbents with surface areas of 50 square meters gram ($m^2/g$) to 1500 $m^2/g$, and preferably from 75 $m^2/g$ to 1000 $m^2/g$, may be employed. Because the sorbent introduced is competing with the combustion process fly ash as an adsorbent for the pre-dioxins and pre-furans, the ratio of the surface area of the sorbent to that of the fly ash may be used as a qualitative guide to the required rate of sorbent addition to the gas. That is, if the surface area of the sorbent is roughly the same as that of the combustion process fly ash, then the sorbent addition rate is advantageously greater than the fly ash carryover rate, and preferably from 2 to 15 times the fly ash rate. For a sorbent which has 10 or more times the surface area of the combustion process fly ash, a sorbent rate of from 1 to 10 times the fly ash rate, and preferably from 1 to 5 times the fly ash rate, may be used. However, the adsorption equilibrium of the pre-dioxins and pre-furans on the sorbent vs. the adsorption equilibrium of these compounds on fly ash at the temperatures of injection must also be considered. If, for a given temperature range, sorbent adsorption of the pre-furans and pre-dioxins is quantitatively more favorable than adsorption on combustion fly ash, then the ratio of the sorbent addition rate/combustion fly ash rate may be accordingly reduced.

Preferred sorbents are those which have naturally low transition metal content, or which have been pre-treated, such as by acid-washing, to reduce the iron and other transition metal content.

Although it is not intended to limit the present invention to a particular theory or mechanism, it is believed that transition metals, for example iron, present in a sorbent, would cause significant conversion of pre-dioxins and pre-furans to PCDD/PCDF.

Because iron in the sorbent structure is known to be a precursor of one of the reactants ($FeCl_3$) leading to the formation of PCDD/PCDF, it is preferable to employ sorbents that have low transition metal content. Any sorbent material which tends to chemically produce PCDD/PCDF following precursor adsorption, is an unsatisfactory material for the purposes of this invention. A number of sorbents, such as natural Fuller's earths and fly ash, have comparatively high iron contents and therefore would tend to convert adsorbed pre-dioxins and pre-furans to PCDD/PCDF. Preferred sorbents are naturally-occurring low-iron content sorbents as well as sorbents which have been acid-washed or acid-activated to remove transition metals.

Acid washing serves to dissolve and remove from the sorbent material the reactive iron and other transition metals which could function as chlorinated metal reactants for conversion of the pre-dioxins and pre-furans to PCDD/PCDF. Acid activation of sorbents, such as bentonite clays, is well-known and is disclosed, for example, in *Industrial Minerals & Rocks*, Chapter 6, pp. 93–99, published by AIMME, Third Edition, 1960, the disclosure of which is incorporated by reference. Acid activation normally involves use of sulfuric or hydrochloric acid for admixture into an aqueous slurry of the clay. Commercially-available acid-washed sorbents useful in the process and apparatus of this invention are acid-washed bentonite clays, and acid-washed coal-derived activated carbon, such as acid-washed activated carbon produced from lignite commercially available under the name "Hydrodarco" from American Norit Company, Inc. Thus, sorbent materials include acid-washed coal-derived activated carbon, acid-activated swelling bentonite clays (sodium montmorillonites), as well as macroporous synthetic and natural zeolites, gamma-alumina, acid-treated fly ashes, and the like.

Other suitable sorbents are those having high surface areas, typically above 200 $m^2/g$, which bind the pre-dioxin and pre-furan compounds tightly enough to prevent significant surface migration and contact with transition metal present in the sorbent structure and reaction to PCDD/PCDF. Sorbent materials of this latter type include some of the high surface area sorbents, and untreated activated carbon, that is, activated carbon that has not been acid-pretreated, as well as sorbent clays of the hydrous aluminum silicate type.

In the present context, "activated carbon" shall mean any high-surface area sorbent, having a surface area of at least 100 $m^2/g$, derived from coal or vegetable matter such as coconut shells, and the like. Activated carbon derived from vegetable matter such as coconut shells is typically low in iron and other transition metal content. However, this form of activated carbon is relatively expensive. Most relatively inexpensive commercially available activated carbons are derived from coal, and the latter typically have relatively high ash and associated iron and transition metal contents. While an acid-washed low-iron content activated carbon is a preferred material for the purpose of this invention, untreated activated carbon, by reason of its high surface area and ability to minimize surface migration of adsorbed molecules, may also be used.

An additional sorbent useful for the purposes of this invention is acid-washed fly ash. Recycling of fly ash for PCDD/PCDF adsorption has been suggested by Ettahadieh, in U.S. Pat. No. 4,844,875. However, Ettahadieh teaches the recycle of the fly ash produced by the combustion process itself, to adsorb PCDD/PCDF. The iron in the fly ash appears to be at least partly responsible for conversion of adsorbed precursors to PCDD/PCDF. Because there is no provision in Ettahadieh for removal of the iron from the recycled ash, recycle of such fly ash would serve to increase the formation of PCDD/PCDF, not prevent formation of such compounds from their precursors. The "factory" for PCDD/PCDF generation appears to be iron-containing sorbent fly ash, and adding such supplemental fly ash to a combustion gas containing the pre-dioxin and pre-furan precursors would only promote PCDD/PCDF generation, not inhibit it.

Conventional pulverized coal combustors typically produce sintered fly ash with little or no sorption surface area, and these are not suitable sorbents. An acid-treated fly ash that has not been sintered by very high temperature exposure is preferred. Suitable ashes for acid treatment are unsintered ashes such as those typically produced by fluidized bed combustors. However, such coal ash typically contains relatively high amounts of iron. Acid washing removes the reactable iron and transition metals and renders the ash suitable for use in the process of this invention.

In the practice of this invention, the sorbents are injected into the gas at temperatures that are compatible with the stability of their structures. That is, the finely-divided sorbents are injected into the gas at temperatures below the temperatures at which sintering, loss of surface area, or chemical decomposition occurs. Sorbents with a high degree of thermal stability, such as acid-treated fly ashes, may be injected into the hot combustion gases at any temperature below their sintering temperature. For example, if the combustion process is conducted at temperature levels below the sintering temperature of the sorbent, then the thermally-stable sorbent may be introduced directly into the incinerator or furnace itself. In such instances, such thermally-stable sorbents may be injected as a separate stream or together with the waste or fuel being burned. The sorbent then becomes active for the adsorption of the pre-dioxin and pre-furan compounds as the gas cools and adsorption equilibria become favorable. Cooling of the gas following sorbent injection to temperatures where adsorption equilibria becomes favorable may be effected by a number of means. Cooling may be done in energy recovery boilers, air-cooled heat exchangers, water or slurry- or solution-spray quench means including spray drier scrubbers, or other means known to the art.

In the case of the activated carbon, both acid-treated and untreated, respectively, injection of the powdered carbon into the gas train must necessarily be at temperatures less than the ignition temperature of the carbon, typically around 450° C. Where an energy recovery boiler or heat exchanger is employed for gas cooling, the activated carbon may advantageously be introduced at a point where the gas temperature has fallen below 425° C. Multi-pass fire-tube boilers are typically used for energy recovery in cases where relatively low pressure steam generation is acceptable, such as BMW incineration. In such energy recovery boilers, temperatures below 425° C. typically occur upstream of the last downstream boiler pass, and the carbon may therefore be safely introduced into the last boiler pass of such boilers. In water-tube boilers, typically used for generating high-pressure steam in MSW incinerators and coal-fired power plants, the ignition-safe temperature for carbon injection typically occurs in the boiler convective section or economizer, and the carbon may be introduced in either of these sections at a point where the temperature has fallen below the ignition temperature.

Referring again to FIG. 1, the gas/sorbent mixture exiting the energy recovery boiler 22 by means of line 44 is fed to a solids separator means 46 which may be an electrostatic precipitator, fabric filter baghouse or other suitable separator means known to the art. The spent sorbent containing the pre-dioxin and pre-furan reactants and the combustion process fly ash substantially free of PCDD/PCDF are discharged by means of lines 48 and 50 from solids separator 46 and conveyed to disposal or collection bins(not shown) by means of line 52. The particulate-free gas is passed by means of line 54 from solids separation device 46 to blower 56 and then is passed by means of line 58 to the stack 60 for exhaust to the atmosphere by means of line 62.

Figure 2:
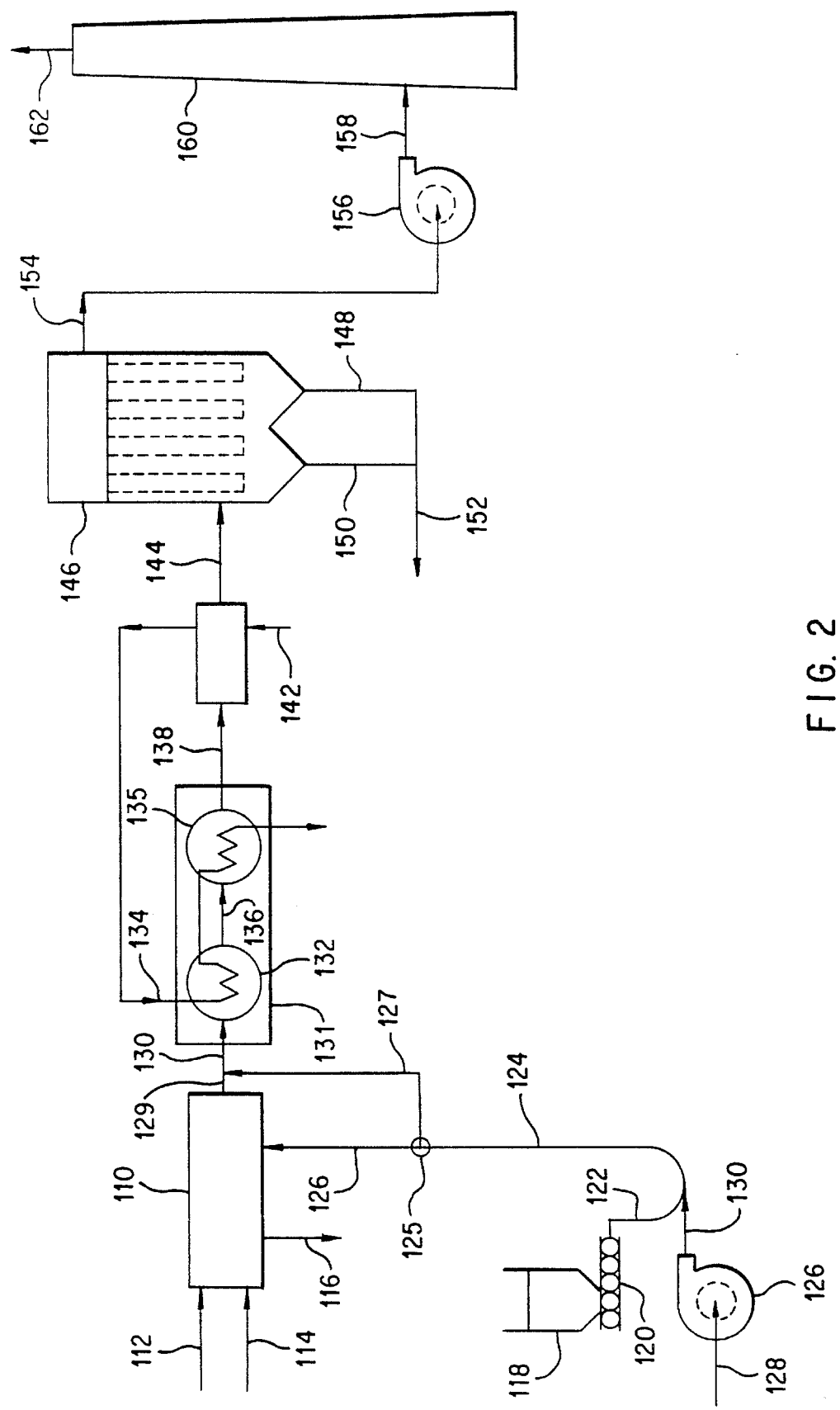
FIG. 2 is a schematic flow drawing illustrating another embodiment of the invention.

Referring now to FIG. 2, a combustion chamber 110, such as a power plant, is supplied with a chlorine-containing fuel by means of line 112 and burned with air supplied by means of line 114. The temperatures in combustion zone 110 are, for example, in the range of from about 1000° C. to 1200° C. Bottom furnace ash is discharged from combustion chamber 110 by means of line 116. Finely divided sorbent is fed from hopper 118 to a screw feeder 120 and then passed by line 122 to pneumatic feed line 124 supplied by blower or compressor 126 operating on an air supplied by line 128 to provide an air stream line 130.

The pneumatically-conveyed finely-divided solid sorbent in line 124 may be passed by means of valve 125 and line 126 and mixed directly with combustion flue gas in combustion chamber 110 which is at temperatures from about 800° C. to about 1000° C. before the combustion gases exit combustion chamber 110. Alternatively, the sorbent may be passed by means of line 127 for admixture with the exhaust gases in line 129 after the exhaust gases have been discharged from combustion chamber 110, and while the gases are at a temperature of from about 700° C. to about 900° C. Thus, according to the embodiments of this invention, as shown in FIG. 2, the sorbent contacts the combustion gases containing fly ash and the precursor reactants at a temperature in the range of from about 700° C. to about 1000° C. depending upon the point at which the sorbent is injected. Preferred sorbents include, for example, acid-washed, unsintered fly ash or an acid-washed bentonite clay, since such sorbents are capable of tolerating high temperatures and will not convert adsorbed pre-dioxins and pre-furans to PCDD/PCDF.

Combustion exhaust gases and sorbent bearing adsorbed pre-dioxins and pre-furans are passed by means of line 130 to multi-pass waste heat boiler 131 having an initial pass 132 and a final pass 135. In boiler 131, boiler water in line 134 is converted to steam. The gas and sorbent exiting the combustion chamber is cooled in pass 132 to a temperature in the range of 500° C.–750° C., passed by means of line 136 to pass 135 where the gas/sorbent mixture is cooled to a temperature in the range of 180°–250° C. Gas and sorbent exiting energy recovery boiler 131 by means of line 138 is further cooled in economizer 140 to a temperature of 100°–180° C. in which water introduced by line 142 is preheated for use as boiler feed water in line 134. Gas and sorbent leaving economizer 140 are fed by means of line 144 to solid separation means 146 which may be an electrostatic precipitator, fabric filter baghouse or other suitable separator means known to the art. The spent sorbent containing the pre-dioxin and pre-furan reactants and the combustion process fly ash substantially free of PCDD/PCDF are removed in the solids separator 146 and are conveyed by means of lines 148 and 150 to line 152 for disposal or collection bins (not shown). The particulate-free gas in line 154 leaving solids separation device 146 enters blower 156, passed to line 158 to stack 160 for exhaust by means of line 162.

The gas cooling/energy recovery system of FIG. 2 includes a recovery boiler and an economizer. The dry injection contacting means of FIG. 1 can also be employed with the fuel-burning furnace and cooling train of FIG. 2 with the injection point chosen with due regard to the thermal and chemical stability characteristics of the sorbent, such as into line 136. In other words, the sorbent should be injected into the gases at the highest gas stream temperature possible to adsorb the maximum pre-dioxins and pre-furans before conversion to PCDD/PCDF takes place.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification.

What is claimed is:

1. A process for minimizing formation of polychlorinated benzodioxin and benzofuran compounds from organic precursor reactants thereof in waste exhaust gases, which process comprises:

contacting combustion process fly ash and combustion exhaust gases containing organic precursor reactants of polychlorinated benzodioxin, polychlorinated benzofuran compounds or mixtures thereof with substantially dry, finely divided, solid, macroporous, sorbent material, said sorbent material being substantially free of chloride-reactable transition metals, at a temperature compatible with the thermal and chemical stability of said sorbent material, to form a first stream, cooling said first stream to adsorb said organic precursor reactants on said sorbent material with substantially no conversion of said adsorbed organic precursor reactants to polychlorinated benzodioxin or benzofuran compounds, to form a second stream comprising a cooled gas stream containing combustion process fly ash and spent sorbent, passing said second stream to a solids separation zone for removal of particulate matter comprising said spent sorbent and said fly ash from said second stream, removing said particulate matter and withdrawing a gas stream substantially free of polychlorinated benzodioxin and benzofuran compounds.

2. The process of claim 1, wherein said sorbent material contacts said combustion exhaust gases at a temperature of at least 290° C.

3. The process of claim 2, wherein said sorbent material contacts said combustion exhaust gases at a temperature in the range of 290° C. to about 450° C.

4. The process of claim 3, wherein said sorbent material contacts said combustion exhaust gases at a temperature in the range of from about 350° C. to about 400° C.

5. The process of claim 1, wherein said sorbent is activated carbon.

6. The process of claim 1, wherein said sorbent is a bentonite clay.

7. The process of claim 1, wherein said first stream is cooled to a temperature of from about 200° C. to about 280° C.

8. The process of claim 1, wherein said solids separation zone comprises a fabric filter baghouse.

9. The process of claim 1, wherein said solids separation zone comprises an electrostatic precipitator.

10. A process for minimizing formation of polychlorinated benzodioxin and benzofuran compounds from organic precursor reactants thereof in waste exhaust gases, which process comprises:

contacting combustion process fly ash and combustion exhaust gases containing organic precursor reactants of polychlorinated benzodioxin, polychlorinated benzofuran compounds, or mixtures thereof with substantially dry, finely divided, solid, macroporous, acid-treated sorbent material, said acid-treated sorbent material having been subjected to acid washing to remove chloride-reactable transition metals, at a temperature compatible with the thermal and chemical stability of said acid-treated sorbent material to form a first stream, cooling said first stream to adsorb said organic precursor reactants on said acid-treated sorbent material with substantially no conversion of said adsorbed organic precursor reactants to polychlorinated benzodioxin or benzofuran compounds, to form a second stream comprising a cooled gas stream containing combustion process fly ash and spent acid-treated sorbent, passing said second stream to a solids separation zone for removal of particulate matter comprising said spent sorbent and said fly ash from said second stream, removing said particulate matter and withdrawing a gas stream substantially free of polychlorinated benzodioxin and benzofuran compounds.

11. The process of claim 10, wherein said acid-treated sorbent material contacts said combustion exhaust gases at a temperature in the range of from about 290° C. to about 450° C.

12. The process of claim 11, wherein said acid-treated sorbent material contacts said combustion gases at a temperature in the range of from about 300° C. to about 400° C.

13. The process of claim 11, wherein said first stream is cooled to a temperature in the range of from about 200° C. to about 280° C. for adsorption of said precursor reactants on said acid-treated sorbent material.

14. The process of claim 10, wherein said sorbent is acid-treated activated carbon.

15. The process of claim 10, wherein said sorbent is an acid-treated unsintered fly ash.

16. The process of claim 10, wherein said sorbent is an acid-treated clay.

17. The process of claim 10, wherein said gases are cooled by direct contact with a cooler liquid in a liquid-spray quenching zone.

18. The process of claim 10, wherein said solids separation zone comprises a fabric filter baghouse.

19. The process of claim 10, wherein said solids separation zone comprises an electrostatic precipitator.

20. A process for minimizing formation of polychlorinated benzodioxin and benzofuran compounds from precursor reactants thereof in exhaust gases, which process comprises:

burning chlorine-containing fuels in a combustion zone to form combustion process fly ash and combustion exhaust gases containing organic precursor reactants of polychlorinated benzodioxin compounds, polychlorinated benzofuran compounds, or mixtures thereof, introducing substantially dry, finely divided, solid, macroporous, acid-treated sorbent material into said combustion zone or upon leaving said combustion zone at temperatures compatible with the thermal and chemical stability of said acid-treated sorbent material to admix with said combustion gases and form a first stream comprising combustion fly ash, acid-treated sorbent material, and said organic precursor reactants, said acid-treated sorbent material having been subjected to acid washing to remove chloride-reactable transition metals, cooling said first stream to adsorb said organic precursor reactants on said acid-treated sorbent material with substantially no conversion of said adsorbed organic precursor reactants to polychlorinated benzodioxin or benzofuran compounds, to form a second stream comprising a cooled gas stream containing combustion process fly ash and spent acid-treated sorbent, passing said second stream to a solids separation zone for removal of particulate matter comprising said spent sorbent and said fly ash, and withdrawing a gas stream substantially free of polychlorinated benzodioxin and benzofuran compounds.

21. The process of claim 20, wherein said sorbent is an acid-treated sorbent.

22. The process of claim 21, wherein said acid-treated sorbent is acid-treated fly ash.

23. The process of claim 21, wherein said acid-treated sorbent is an acid-treated clay.

24. The process of claim 20, wherein said sorbent material contacts said combustion gases at a temperature in the range of from about 700° C. to about 1000° C.

25. The process of claim 24, wherein said sorbent material contacts said combustion gases at a temperature in the range of from about 700° C. to about 900° C.

26. The process of claim 24, wherein said first stream is cooled to a temperature in the range of from about 500° C. to about 750° C.

27. The process of claim 26, wherein said gases are cooled by direct contact with a cooler liquid in a liquid-spray quenching zone.

28. The process of claim 20, wherein said sorbent material is introduced into said combustion zone.

29. The process of claim 20, wherein said sorbent material is introduced into said exhaust gases upon leaving said combustion zone.

30. The process of claim 20, wherein said solids separation zone comprises a fabric filter baghouse.

31. The process of claim 20, wherein said solids separation zone comprises an electrostatic precipitator.

32. The process of claim 1, wherein said sorbent material has a surface area of from about 75 to about 1000 square meters per gram.

33. The process of claim 1, wherein all of said removed particulate matter is withdrawn from the process without recycle.

34. The process of claim 1, wherein said combustion process fly ash is contacted with said sorbent material at a sorbent rate of from 1 to 10 times the fly ash rate.

35. The process of claim 1, wherein said chloride-reactable transition metal is iron.

36. The process of claim 10, wherein sorbent material contacts said combustion exhaust gases at a temperature of at least 290° C.

37. The process of claim 10, wherein said sorbent material has a surface area of from about 75 to about 1000 square meters per gram.

38. The process of claim 10, wherein all of said removed particulate matter is withdrawn from the process without recycle.

39. The process of claim 10, wherein said combustion process fly ash is contacted with said sorbent material at a sorbent rate of from 1 to 10 times the fly ash rate.

40. The process of claim 10, wherein said chloride-reactable transition metal is iron.

41. The process of claim 20, wherein said sorbent material has a surface area of from about 75 to about 1000 square meters per gram.

42. The process of claim 20, wherein all of said removed particulate matter is withdrawn from the process without recycle.

43. The process of claim 20, wherein said combustion process fly ash is contacted with said sorbent material at a sorbent rate of from 1 to 10 times the fly ash rate.

44. The process of claim 20, wherein said chloride-reactable transition metal is iron.

* * * * *